June 23, 1964

M. BUSHI 3,137,920

METHOD OF MAKING BALL BEARINGS

Filed Feb. 21, 1962

INVENTOR.
MICHAEL BUSHI
BY
Oberlin, Maky & Donnelly
ATTORNEYS

United States Patent Office 3,137,920
Patented June 23, 1964

3,137,920
METHOD OF MAKING BALL BEARINGS
Michael Bushi, 3268 W. 33rd St., Cleveland 9, Ohio
Filed Feb. 21, 1962, Ser. No. 174,730
3 Claims. (Cl. 29—148.4)

The present invention relates generally as indicated to a method of making ball bearings and more particularly to a two-piece ball bearing having a full complement of balls.

Hitherto, ball bearings of the type having a full complement of balls between the race members have comprised at least one split race member including means for holding the split parts together. It is also known in the art to provide inner and outer race members of which the inner member has an outside diameter such that the full complement of balls may be positioned in the raceway of the outer member, whereupon said inner member is expanded in diameter to bring the inner raceway into engagement with the balls to retain them between said members. As apparent, the making of the last-mentioned type of two-piece ball bearing entails radial expansion of the inner race member and, as a consequence, the stretching of the metal makes it difficult to match the curvature of the inner raceway with the radii of the balls.

Accordingly, it is a principal object of this invention top rovide a two-piece ball bearing assembly in which one of the race members is subjected to compressive forces to secure conformance of its raceway with the radii of the balls.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of a few of the various ways in which the principle of the invention may be employed.

Figure 5:
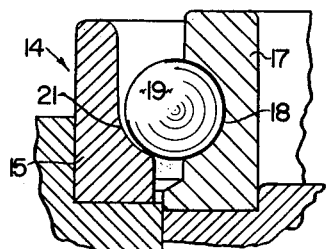
FIGS. 5 and 6 are enlarged radial cross-section views similar to FIGS. 3 and 4, except showing a ball bearing assembly wherein the outer race member is deformed to provide the final ball bearing assembly.
Figure 6:
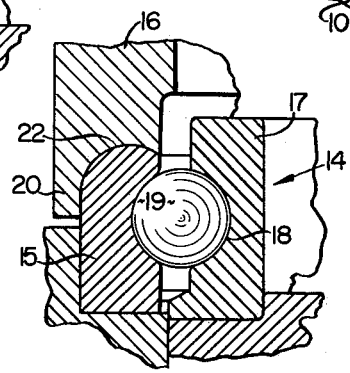
Figure 9:
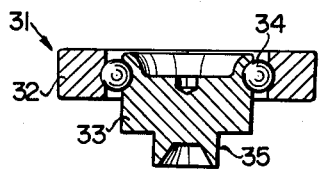
Figure 7:
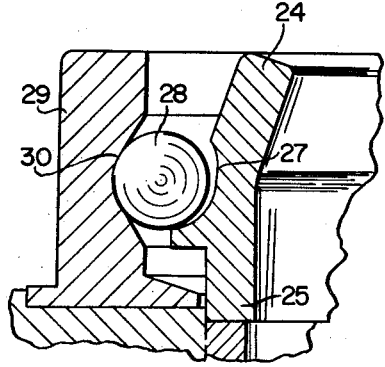
Figure 8:
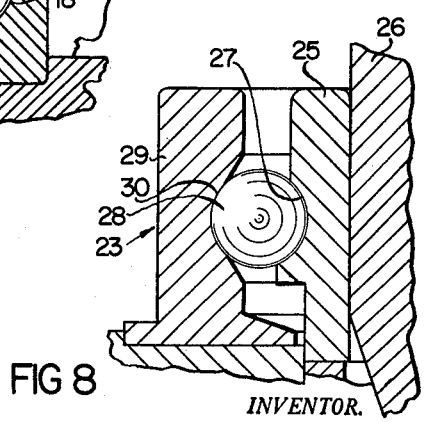

FIGS. 7 and 8 also are enlarged radial cross-sections similar to FIGS. 3 and 4 and 5 and 6, except showing yet another ball bearing embodying the present invention; and FIG. 9 is a cross-section view of a two-piece stud-type ball bearing embodying the present invention.

Referring now in detail to the drawings, and first to FIGS. 1 to 4, the bearing 1 there shown comprises an outer race member 2 having an internal groove (or outer raceway) 3 preferably of radius corresponding to the radii of the balls 4. The inner race member 5 fabricated as of dead soft, hardenable steel is formed with a curved shoulder 6 which is of radius slightly greater than the radii of the balls. For example, the radius of the surface 6 will generally be .015″ larger in radius than the radii of the balls 4. The cylindrical portion 7 of the inner member is preferably of outside diameter .010″ to .015″ less than the desired final root diameter of the inner raceway 8 of the finished bearing of FIGS. 1, 2 and 4.

Figure 1:
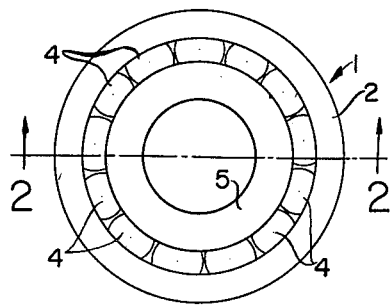
FIG. 1 is a top plan view of a two-piece ball bearing made in accordance with this invention.
Figure 2:
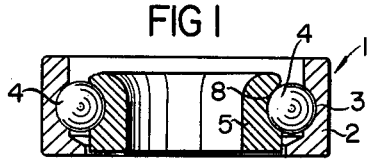
FIG. 2 is a cross-section view along line 2—2, FIG. 1.
Figure 3:
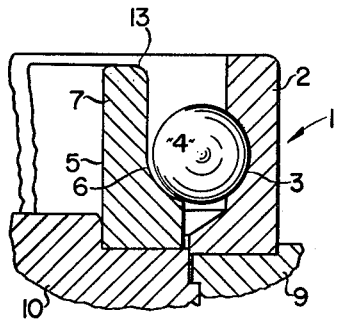
FIG. 3 is a much enlarged radial cross-section view of the FIG. 2 bearing prior to final assembly of the parts.
Figure 4:
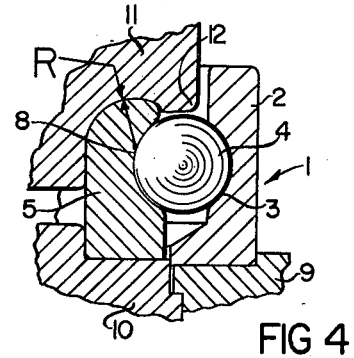
FIG. 4 is a view similar to FIG. 3, except showing the inner race member deformed to form a complete ball bearing assembly.

In order to complete the bearing from its FIG. 3 condition, the outer and inner race members 2 and 5 are supported on die blocks 9 and 10, whereupon a curling punch 11 is forced axially into the upper end of the inner race member 5 to not only radially expand or flare out the upper end thereof, but also to apply substantial axial compressive force thereon to cause the resulting raceway 8 to conform to the balls 4. This curling or flaring operation locks the inner and outer race members 5 and 2 together with a full complement of balls 4 therebetween, said members having raceways 8 and 3 matching the radii of the balls 4.

In bearings of this type the space between the raceways contains a full complement of balls 4 with only a small clearance of say, $\frac{1}{32}$″ between the first ball and the last ball when they are crowded together in contact with one another.

In mass production of bearings of this type, the race member 5 and die block 10 will be pressed downward against a spring (not shown) for loading the required number of balls 4 between the race members 2 and 5, whereupon the assembly of FIG. 3 is transferred to a curling station whereat, while both die blocks 9 and 10 are solidly backed up, the punch 11 is forced downward to curl out the portion 7 and to radially deform the race member 5 so that its initially curved shoulder 6 and its initially cylindrical surface of portion 7 define the raceway 8 that matches the balls 4 in the completed bearing. Thereafter, the bearing 1 is heat-treated, preferably in an inert atmosphere.

The punch 11 has an annular lip 12 which predetermines the extent of curling and "traps" the metal for application of substantial compressive force to secure conformance of the raceway 8 with the balls 4. It has been found essential to round the outer corner 13 (.015″ to .030″ radius) of the tubular portion 7 in order to prevent splitting during the curling operation. The inner corner may have a .005″ radius.

It has been discovered that the raceway 8 will have a true radius matching the ball radius within close limits only if the punch 11 has a radius R approximately equal to the radius of the balls 4. In this way, the metal is trapped and subjected to axial compression of such magnitude that the portion 7 does not split and is swaged or deformed to match the balls 4 without Brinelling of the balls in the finished raceway 8. Attempts simply to flare the portion 7 with a flaring tool having a flaring surface struck from the center of the balls 4 and having a radius equal to that of the balls 4 plus the wall thickness of portion 7 have resulted in splitting and in frusto-conical raceways 8 which do not match the balls 4.

The bearing 14 shown in FIGS. 5 and 6 is generally the same as that of FIGS. 1 to 4, except that the outer race member 15 is curled inwardly and is subjected to axial compressive force by the punch 16 to form the completed bearing.

The bearing 14 comprises an inner race member 17 formed with the raceway 18 for the balls 19, and the outer race member 15 which, when curled in and compressed axially, has a raceway 20 matching the balls 19. As in FIG. 3, the race member 15 has a curved shoulder 21 of radius slightly greater than that of the balls 19. The punch 16 preferably has a curved surface 22 of radius approximately equal to that of the balls 19.

The bearing 23 of FIGS. 7 and 8 corresponds generally to bearing 1 of FIGS. 1 to 4, except that the upper end portion 24 of the inner race member 25 is initially of frusto-conical form, whereupon the tapered punch 26 is effective to radially outwardly deform the frusto-conical portion 24 to cylindrical form to cause the raceway 27 to match the balls 28. The outer race member 29 has a raceway 30 which optionally may be of V-shape or curved, as desired.

The bearing 31 of FIG. 9 is of the stud-type having an outer race 32, an inner race 33 (curled as in FIG. 4), and a full complement of balls 34 therebetween. The inner race 33 has an integral stud 35 for riveting to a suitable mounting member.

Other modes of applying the principle of the invention may be employed, change being made as regards the details described, provided the features stated in any of the following claims or the equivalent of such be employed.

I, therefore, particularly point out and distinctly claim as my invention:

1. The method of making a two-part ball bearing comprising the steps of providing an outer race member having a raceway of a radius corresponding to the radii of said ball bearings, providing a partially formed inner race member having a curved shoulder of greater radius than said radii of said bearings and a generally straight, annular upper portion, disposing a full complement of said ball bearings between said inner and outer race members, said bearings resting in said raceway in said outer race member and on said curved shoulder of said inner race member, and curling said straight, annular upper portion of said inner race member around said ball bearings by means of a punch member provided with an annular groove defined along one side by an annular lip, said groove having a radius approximately equal to the radius of said ball bearings, said annular lip trapping said upper portion of said inner race member, whereby the curled upper portion of said inner race member closely conforms to the shape of said ball bearings.

2. The method of making a two-part ball bearing comprising the steps of providing an inner race member having a raceway of a radius corresponding to the radii of said ball bearings, providing a partially formed outer race member having a curved shoulder of greater radius than said radii of said bearings and a generally straight, annular upper portion, disposing a full complement of said ball bearings between said inner and outer race members, said bearings resting in said raceway in said inner race member and on said curved shoulder of said outer race member, and curling said straight, annular upper portion of said outer race member around said ball bearings by means of a punch member provided with an annular groove defined along one side by an annular lip, said groove having a radius approximately equal to the radius of said ball bearings, said annular lip trapping said upper portion of said outer race member, whereby the curled upper portion of said outer race member closely conforms to the shape of said ball bearings.

3. The method of making a two-part ball bearing having inner and outer race members comprising the steps of providing one of said race members with a raceway of a radius corresponding to the radii of said ball bearings, the other of said race members being partially formed and having a curved shoulder of greater radius than said radii of said bearings and a generally straight, annular upper portion, disposing a full complement of said ball bearings between said race members, said bearings resting in said raceway in said one race member and on said curved shoulder of said other race member, and curling said straight, annular upper portion of said other race member around said ball bearings by means of a punch member provided with an annular groove defined along one side of an annular lip, said groove having a radius approximately equal to the radius of said ball bearings, said annular lip trapping said upper portion of said other race member, whereby the curled upper portion of said other race member closely conforms to the shape of said ball bearings.

References Cited in the file of this patent

UNITED STATES PATENTS

| | | |
|---|---|---|
| 872,168 | Clark | Nov. 26, 1907 |
| 1,173,793 | George | Feb. 29, 1916 |
| 2,316,449 | Parker | Apr. 13, 1943 |
| 2,370,173 | Kendall | Feb. 27, 1945 |
| 2,910,765 | Heim | Nov. 3, 1959 |
| 2,998,636 | Spence et al. | Sept. 5, 1961 |
| 3,013,327 | Spence | Dec. 19, 1961 |

FOREIGN PATENTS

| | | |
|---|---|---|
| 502,554 | Belgium | Apr. 14, 1951 |